(12) United States Patent
Zalevsky

(10) Patent No.: US 7,936,522 B2
(45) Date of Patent: May 3, 2011

(54) SYSTEM AND METHOD FOR IMAGING WITH EXTENDED DEPTH OF FOCUS AND INCOHERENT LIGHT

(75) Inventor: Zeev Zalevsky, Rosh HaAyin (IL)

(73) Assignee: Xceed Imaging Ltd., Rosh HaAyin (IL)

( * ) Notice: Subject to any disclaimer, the term of this patent is extended or adjusted under 35 U.S.C. 154(b) by 372 days.

(21) Appl. No.: 12/254,152

(22) Filed: Oct. 20, 2008

(65) Prior Publication Data

US 2009/0074239 A1 Mar. 19, 2009

Related U.S. Application Data

(63) Continuation of application No. PCT/IL2007/000500, filed on Apr. 22, 2007.

(60) Provisional application No. 60/793,226, filed on Apr. 20, 2006.

(51) Int. Cl.
*G02B 9/00* (2006.01)
(52) U.S. Cl. ....................................... 359/738
(58) Field of Classification Search ........... 359/738–740
See application file for complete search history.

(56) References Cited

U.S. PATENT DOCUMENTS

| | | | |
|---|---|---|---|
| 3,700,895 A | 10/1972 | Dicke | |
| 5,684,569 A * | 11/1997 | Sugaya et al. | 355/71 |
| 6,847,472 B2 | 1/2005 | Masuda | |
| 7,003,177 B1 | 2/2006 | Mendlovic et al. | |
| 2005/0094290 A1 | 5/2005 | Ben-Eliezer et al. | |
| 2006/0034003 A1 | 2/2006 | Zalevsky | |

OTHER PUBLICATIONS

International Search Report, mailed Dec. 18, 2007, from International application No. PCT/IL2007/000500, filed Apr. 22, 2007.
International Preliminary Report on Patentability, dated Mar. 10, 2009, from International application No. PCT/IL2007/000500, filed Apr. 22, 2007.
Ben-Eliezer, E. et al., "All-optical extended depth of field imaging system," J. Opt. A: Pure Appl. Opt. 5, S1-S6 (2003).
Dowski, E. R et al., "Extended depth of field through wave-front coding," Appl. Opt. 34 (11), 1859-66 (1995).
Gaertner, W. et al., "Ein Experiment zur Ueberschreitung der Abbeschen Aufloesungsgrenze," Z. Physik 174 (1), 18-23 (1963)—absract only.
Lukosz, W., "Optical Systems with Resolving Powers Exceeding the Classical Limit," J. Opt. Soc. Am. 56 (11), 1463-72 (1966).
Ojeda-Castaneda, J. et al., "Arbitrarily high focal depth with a quasioptimum real and positive transmittance apodizer," Appl. Opt. 28 (13), 2666-70 (1989).
Sauceda, A. et al., "High focal depth with fractional-power wave fronts," Opt. Lett. 29 (6), 560-62 (2004).
Van Der Gracht, J. et al., "Broadband behavior of an optical-digital focus-invariant system," Opt. Lett. 21 (13), 919-21 (1996).

(Continued)

*Primary Examiner* — Scott J Sugarman
(74) *Attorney, Agent, or Firm* — Houston Eliseeva, LLP

(57) ABSTRACT

An optical arrangement is provided for use in imaging with a large depth of focus. The optical arrangement comprises an aperture unit, and a replication unit. The replication unit is configured for producing a plurality of replicas of an input optical field passed through the aperture unit such that the replicas include at least two replicas that are of substantially the same phase distribution and are created at different regions of the aperture unit plane.

12 Claims, 8 Drawing Sheets

OTHER PUBLICATIONS

Zalevsky, Z. et al., "Optical Systems with Improved Resolving Power," Progress in optics, vol. XL, Ch. 4 (2000).

Zalevsky Z. et al., "All-optical axial super resolving imaging using a low-frequency binary-phase mask," Opt. Exp. 14 (7), 2631-43 (2006).

H. Dammann and K. Gortler High-Efficiency In-Line Multiple Imaging By Means of Multiple Phase Holograms Optics Communications, Jul. 1, 1971, pp. 312-315, vol. 3, No. 5.

European Search Report, mailed May 3, 2010, from EP Application No. 07736240.

* cited by examiner

SYSTEM AND METHOD FOR IMAGING WITH EXTENDED DEPTH OF FOCUS AND INCOHERENT LIGHT

RELATED APPLICATIONS

This application is a Continuation of PCT application serial number PCT/IL2007/000500, filed on Apr. 22, 2007, which claims the benefit under 35 USC 119(e) of U.S. Provisional Application No. 60/793,226, filed on Apr. 20, 2006, both of which are incorporated herein by reference in their entirety.

FIELD OF THE INVENTION

This invention relates to optical imaging with extended depth of focus.

BACKGROUND OF THE INVENTION

Imaging with a large depth of focus is desirable in many fields, including photography, film, and various detection applications. However, a region of longitudinal positions at which an object can be sharply imaged is limited, and in general, the larger the imaging module's aperture, the smaller its depth of focus, and the smaller the imaging module's aperture, the larger its depth of focus. For example, lens has a limited depth of focus; but in the extreme case of small aperture it behaves as a pinhole camera, and therefore practically provides a very large depth of focus. However, the pinhole camera's high depth of focus comes at a price of low lateral resolution and low energetic efficiency. In particular, point spread function (PSF) of pinhole is proportional to $\lambda D/d_i$, where $\lambda$ is a light wavelength, D is a pinhole aperture, and $d_i$ is a distance between the aperture and a light detection surface; such PSF yields the depth of focus proportional to $\lambda(d_i/D)^2$, resolution proportional to $(\lambda D/d_i)^{-1}$, and energetic efficiency proportional to $D^2$. Thus, a pinhole, while having a very large depth of focus owing to very small aperture D, at the same time has a low resolution (large PSF) and a low energetic efficiency.

SUMMARY OF THE INVENTION

There is a need in the art for an imaging technique, allowing imaging with a relatively large depth of focus, high imaging resolution, and high imaging energetic efficiency. A presented here novel technique, constructed by the inventors, has adaptations (versions and embodiments) useful for such imaging.

The main idea of the invention consists of utilizing at least two replications of an object's chirp such that these replications are substantially the same but are created at different locations within the aperture plane. It should be understood that substantially the same replications signify the same phase distribution of optical field generated by the chirp, this field matches with itself (effect of autocorrelation peak). The amount of a shift between the replicas within the aperture plane corresponds to a certain spatial frequency in an imaging plane (at the detector). As a result, a large depth of focus is provided for this spatial frequency.

The inventors have found that, for useful imaging, a large depth of focus, such that of the pinhole, may be combined with a super resolved imaging. In the field of super-resolution (i.e. in the field of super resolved imaging), spatial degrees of freedom are recovered by sacrificing other degrees of freedom, such as polarization, wavelengths and time. For example, large depth of focus is somewhat related to longitudinal super resolution.

With respect to the large depth of focus, it can be obtained not only by the aperture in the form of pinhole. According to some embodiments of the invention, it can also be obtained by an aperture with an array of randomly distributed pinholes, or with a diffuser, or with both an array and a diffuser, as well as by other ways.

A large depth of focus technique based on the use of a random aperture, also called random plate, can be somewhat advantageous over technology based on lenses, since, in the above-mentioned extreme case of a small aperture, each of the lenses does not produce a substantial quadratic phase effect, and therefore it can be redundant.

Accordingly, in some adaptations, the invented technique for large depth of focus and super-resolved imaging does not rely on lens (i.e. it is lensless), but relies rather on a random plate placed in the aperture plane and devoid of optical power. The energetic efficiency of the technique can be high; i.e. much larger than that of a single pinhole. The technique uses imaging with an instantaneous modulation transfer function (MTF) in a form of a sequence of spikes, which spatial frequencies can be changed.

In preferred embodiments of the invention, the super resolving result is obtained by scanning, in some embodiments mechanical scanning, of the aperture plane with the random plate.

The scanning technique may be selected such that all spatial frequencies are presented in the resulting image and no digital processing is needed. Turning back to the random plate in the aperture plane, it can be composed out of an opaque plate with randomly distributed optical windows (e.g. holes) creating a random transmission/blocking distribution, or it can be composed out of a transparent plate with randomly distributed diffusing islands creating a random phase distribution (i.e. out of a diffuser), or it can be composed out both a random pinhole pattern and a diffuser. It should be understood, that the term random is used here in connection with the technique of inventors: it is used to refer to patterns which produce a characteristic (spiky) autocorrelation function, as it will be clear from below. The random plate presents by itself a special kind of optical spatial filter. In preferred embodiments, the random distribution is such that at least half of the energy passes through. For the totally random spatial distribution, its auto-correlation still has a "delta-functional" spike as in the case of a single pinhole. Thus, the inventors have found a way to concurrently obtain a relatively high energetic efficiency (of half instead of almost zero in the pinhole camera case) and large depth of focus. However, without scanning, the resolution is still low, because the MTF, which is the absolute value of the OTF (i.e. the optical transfer function—auto-correlation of the CTF, coherent transfer function), of the plate consists of a single high delta-functional spike and a few lower delta-functional spikes. Therefore, the inventors have included an option to scan the aperture plane with the random plate and integrate in time the intensity at the detector into their technique. The scanning yields super-resolving imaging and allows for concurrently obtaining extended depth of focus, high spatial resolution, and energetically efficient image. It should be reiterated, that the super resolution can be obtained in an all-optical manner, in which no image processing is required. However, in some embodiments the super-resolution may be obtained with the use of image processing. The super resolution applied in the described approach can be categorized as time multiplexing.

Thus, according to one broad aspect of the present invention, there is provided an optical arrangement for use in imaging with a large depth of focus, said optical arrangement comprising an aperture unit, and a replication unit configured for providing a plurality of replicas of an input optical field such that said replicas include at least two replicas that are of substantially the same phase distribution and are created at different regions of the aperture unit plane.

In preferred embodiments of the invention, the replication unit comprises at least first and second symmetrizing units configured for providing the at least two replicas of the input optical field while sequentially symmetrizing the input optical field projected on said aperture unit with respect to first and second centers of symmetry, respectively. The first symmetrizing unit may be configured to symmetrize a portion of a chirp of the input optical field passed through said aperture unit, while the second symmetrizing unit is configured to symmetrize an output of the first symmetrizing unit.

In some embodiments of the invention, the aperture unit and the replication unit are configured such that at least one of the replicas is displaceable with respect to the other. This can be achieved using a scanner, configured and operable to provide such displacement by providing a relative displacement of at least one of the aperture unit and the first symmetrizing unit with respect to the second symmetrizing unit.

The replication unit may be configured with reflective surfaces (e.g. mirrors), or may include corner prisms, SLM, optical fibers.

In some embodiments of the invention, the reflective surfaces are formed by at least first and second reflector units accommodated in a spaced-apart relationship along an optical axis of light propagation through the optical arrangement towards an imaging plane. Each of the first and second reflector units may include two reflectors defining mutually perpendicular reflective surfaces such that the reflective surfaces of the first reflector unit are substantially parallel to the respective reflective surfaces of the second reflector unit.

As indicated above, in some embodiments of the invention, the aperture unit may comprise a random plate.

The optical arrangement may include or be used with a pixel detector array in an imaging plane.

According to another broad aspect of the invention, there is provided a method for use in imaging to provide imaging with a large depth of focus, the method comprising passing an input optical field to be imaged through an aperture plate, and optically processing the optical field passed through the aperture plate to produce a plurality of replicas of said optical field such that said replicas include at least two replicas that are of substantially the same phase distribution and are created at different regions of the aperture plane.

BRIEF DESCRIPTION OF THE DRAWINGS

To further clarify the above and other advantages and features of the present invention, and to further show how it may be carried out in practice, an additional, at times more particular, description of the invention and invention features will be rendered in the below detailed description, at times with reference to the appended drawings. It is appreciated that these drawings, when depict only particular embodiments of the invention, are not to be considered limiting of its scope. Hence, the invention will continued to be described and explained with additional specificity and detail through the use of the accompanying drawings in which.

DETAILED DESCRIPTION OF THE PREFERRED EMBODIMENTS

Figure 1A:
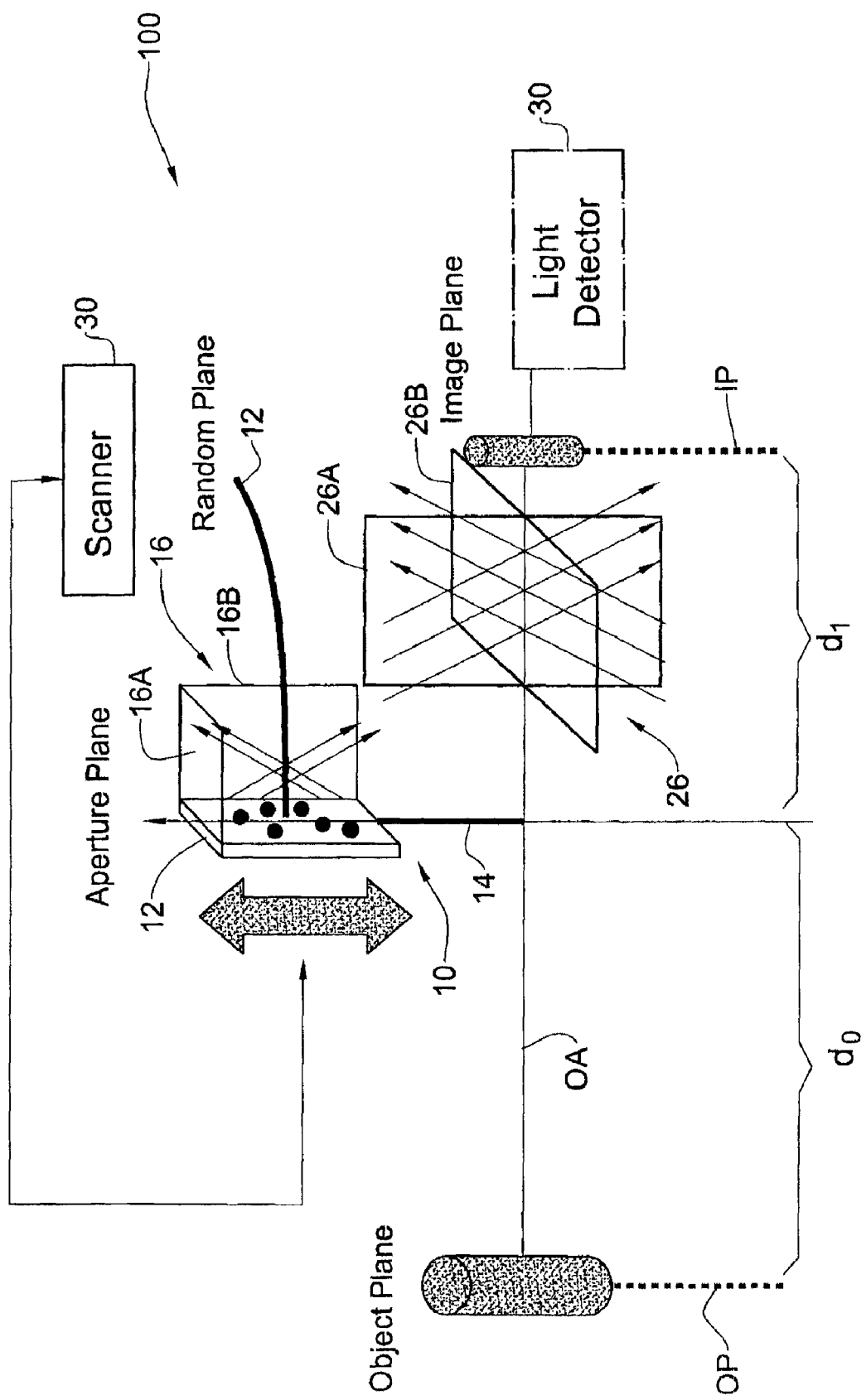
FIGS. 1A and 1B show side and rear views, respectively, of an example of the device of the present invention.
Figure 1B:
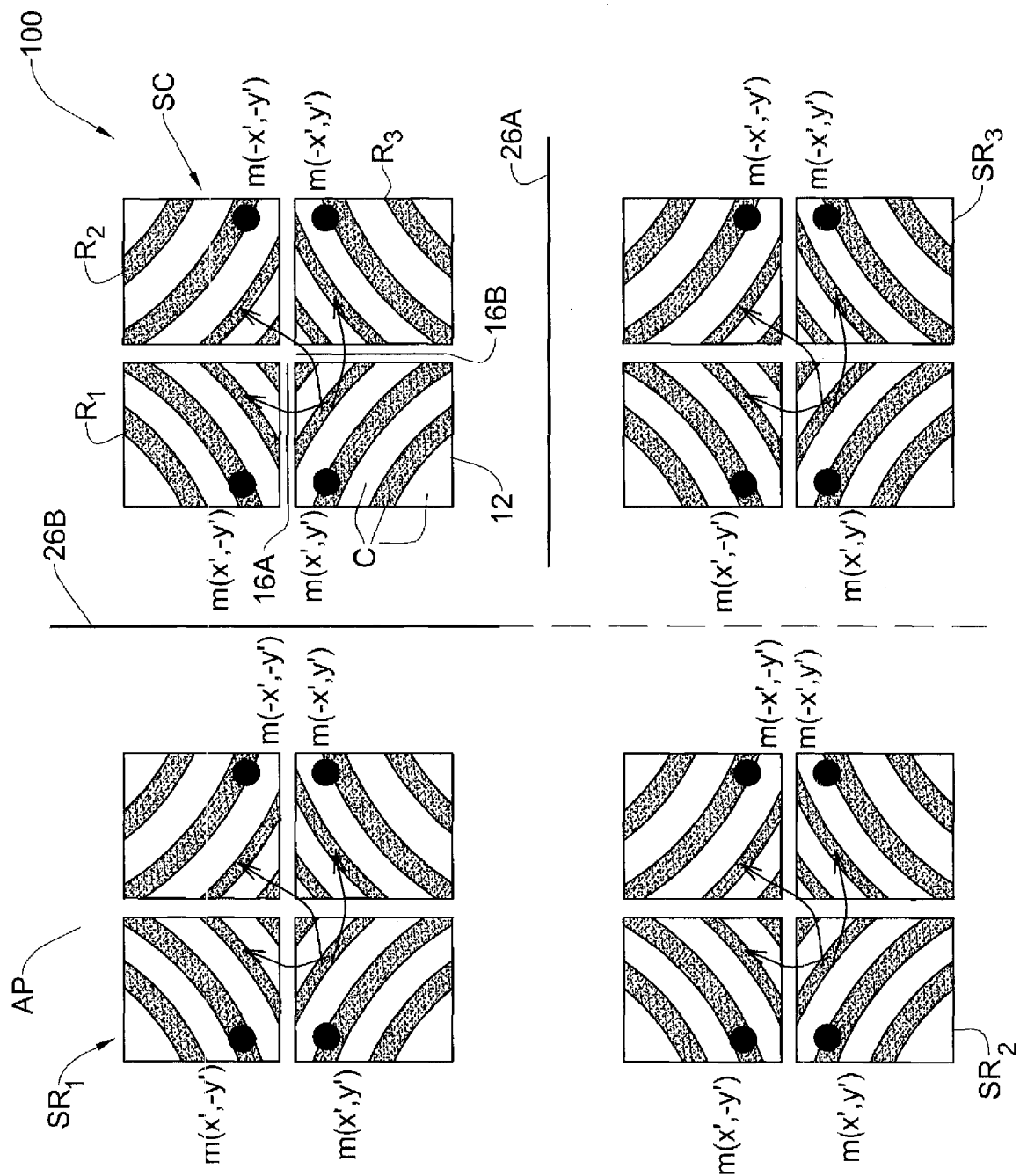

Referring to FIGS. 1A and 1B, there is schematically illustrated an example of a device 100 configured and operable according to the invention. In FIG. 1A a side view of device 100 is shown. The device includes an aperture unit 10, e.g. including a random aperture plate 12 within a curtain 14, and includes a replication unit, which in the present not-limiting example is formed by a first optical symmetrizing unit 16 and a second optical symmetrizing unit 26.

Generally, the replication unit is configured to produce a plurality of replicas of an input optical field, including at least two replicas of substantially the same phase distribution created at different regions of the aperture plane. In the present example, this effect is achieved using two symmetrizing units. Also, in the present example, the symmetrizing units are formed by reflective surfaces. It should, however, be understood that the invention is not limited to this specific example, and other replicating units can be used, such as those including corner prisms, array of optical fibers, or spatial light modulator (SLM).

First symmetrizing unit 16 includes mirrors 16A and 16B, oriented orthogonally to the random plate and to each other and parallel to an optical axis OA of the device (i.e. an axis of light propagation from the aperture plane towards an imaging plane where a detector is located). Each of the mirrors may be opaque or partially transparent, for example semi-transparent. Second symmetrizing unit 26 includes two mirrors 26A and 26B, oriented orthogonally with respect to each other; an intersection of their planes is parallel to optical axis OA or coincides with it. Again, each of the mirrors may be opaque or partially transparent, for example semi-transparent. Units 16 and 26 are aligned with respect to each other: mirrors 16A and 26A, as well as mirrors 16B and 26B, are parallel. Device 100 may also include a light detector 30, for example a pixel detector array, positioned in an imaging plane IP of the device. The imaging plane is relatively far, compared with the mirrors axial size, from the aperture plane and the mirrors.

Optionally, device 100 includes a scanner 30, configured and operable to effectively shift a scanning head, including random aperture 10 and first symmetrizing unit 16, in the aperture plane. The scanner may be programmed (e.g. pre-programmed) for shifting the scanning head along a desired path and time schedule. The scanner may be mechanical, e.g. of a stepper type, or electronic, providing an effect equivalent to that of the mechanical scanner, but without mechanical shifting of the aperture.

In FIG. 1B a rear view of the aperture plane of device 100 and an effect of the device is shown. Random plate 12 is within the lower left quadrant defined by mirrors 16A and 16B and within the upper right quadrant defined by mirrors 26A and 26B. The random plate passes or diffracts light from an object plane (OP in FIG. 1A) towards the inside of the device: towards first symmetrizing unit 16, second symmetrizing unit 26, and imaging plane IP. The axial length of the mirrors is relatively small when compared to the overall length of the device.

When device 100 is used for imaging of an object, the aperture plane (the plane where the random plate element is placed) is illuminated by a phase chirp C, illustrated in FIG. 1B by black and gray concentric lines, meaning the chirp's phase distribution (only the part of the chirp being within random plate 12 is shown). The chirp has a quadratic phase distribution and can be quantified by the amount of defocusing [6].

Figure 1C:
FIG. 1C shows a replicating effect of mirrors positioned near the aperture plane.

First symmetrizing unit 16 effectively adds three replicas $R_1$-$R_3$ of the chirp. The replicas are either due to light reflected from the mirrors or light passed through the mirrors (the latter is in case of partially transparent mirrors and dependent on projection of a view point on the aperture plane). For example, a photograph illustrating creation of four replicas of a marker cap is shown in FIG. 1C.

Turning back to FIG. 1B, as a result of replication by unit 16, the optical field is generated which is proportional to $ag(x',y')+bg(-x', y')+cg(x', -y')+dg(-x', -y')$, where $\{a, b, c, d\}$ are field mirroring coefficients of mirrors 16A and 16B, and $g(x',y')$ is the product of the chirp wave field with the random plate field transmission function. Coordinate axes $(x',y')$ have origin (which is $(x_0,y_0)$ in the global $(x,y)$ coordinate system) in the top right corner of the random plate 12 and can move with the random plate. Further, a symmetrized chirp SC is formed in the upper right quadrant defined by second symmetrizing unit 26 including mirrors 26A and 26B. Thus, similarly to the first symmetrizing unit 16, second symmetrizing unit 26 adds to the aperture plane three replicas $SR_1$-$SR_3$ of the symmetrized chirp SC (imaging plane is remote and the axial size of symmetrizing units 16 and 26 is not substantial).

Figure 1D:
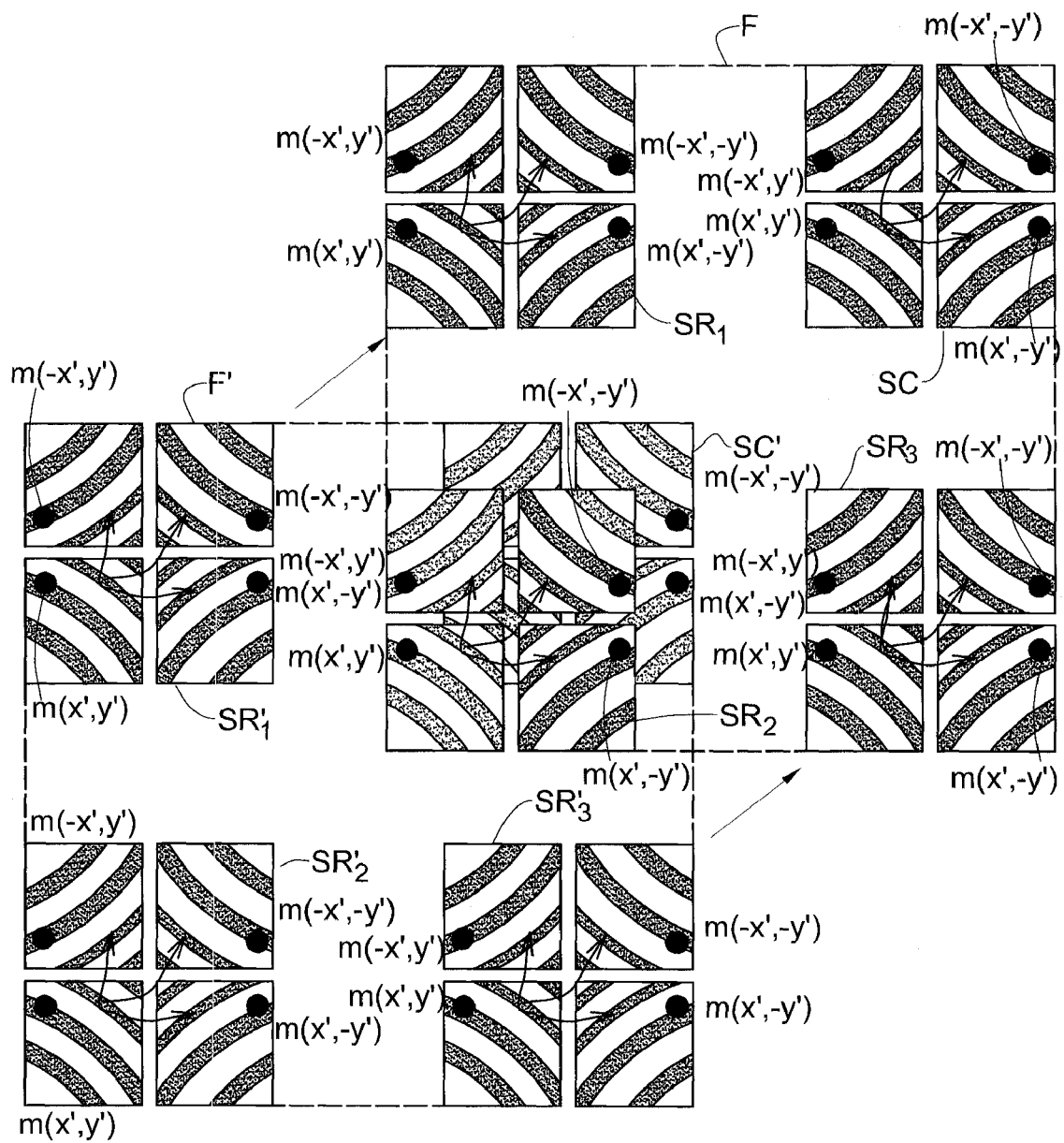
FIG. 1D illustrates a mechanism according to which a static device of the invention achieves a high Optical Transfer Function for certain spatial frequencies.
Figure 2A:
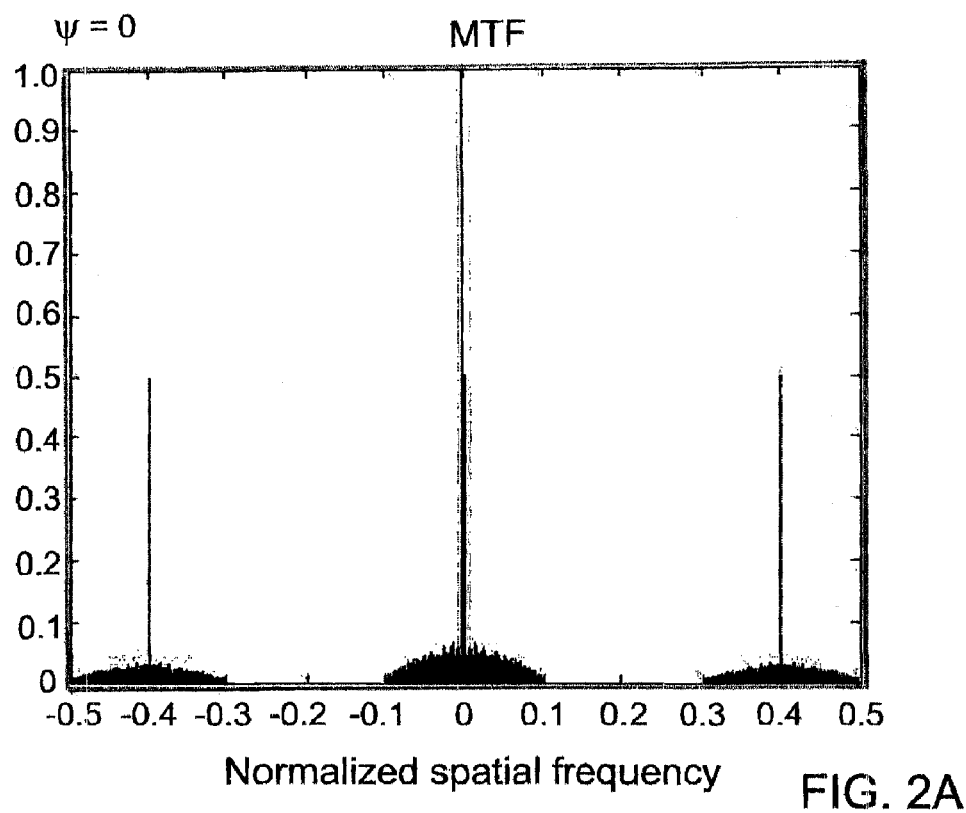
FIGS. 2A-2D illustrate Optical Transfer Functions achieved by a device of the invention for various degrees of object defocusing.
Figure 2B:
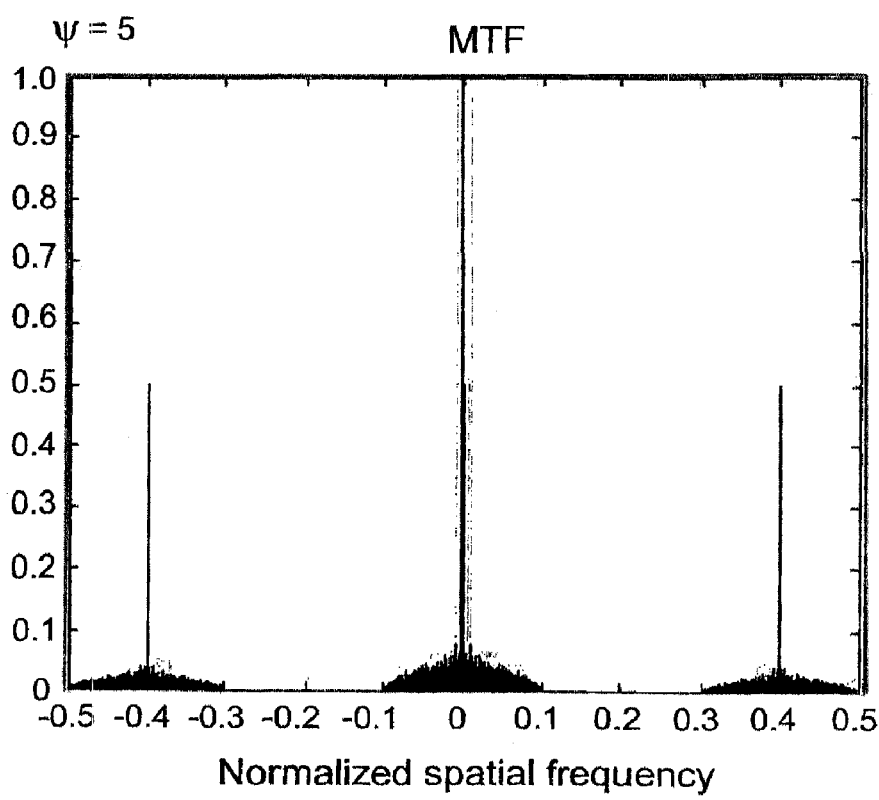
Figure 2C:
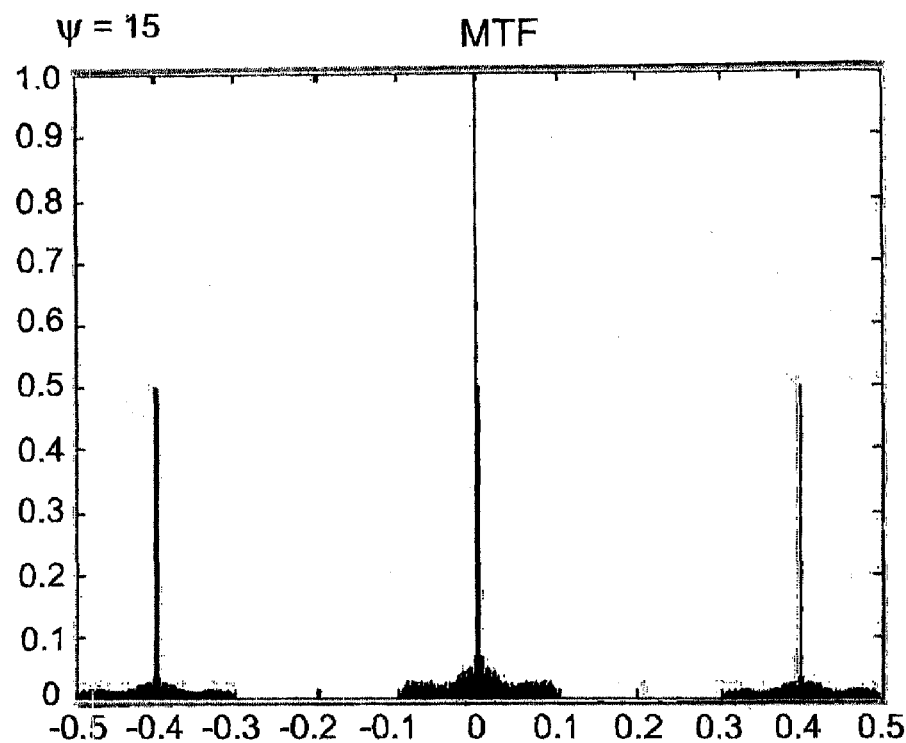
Figure 2D:
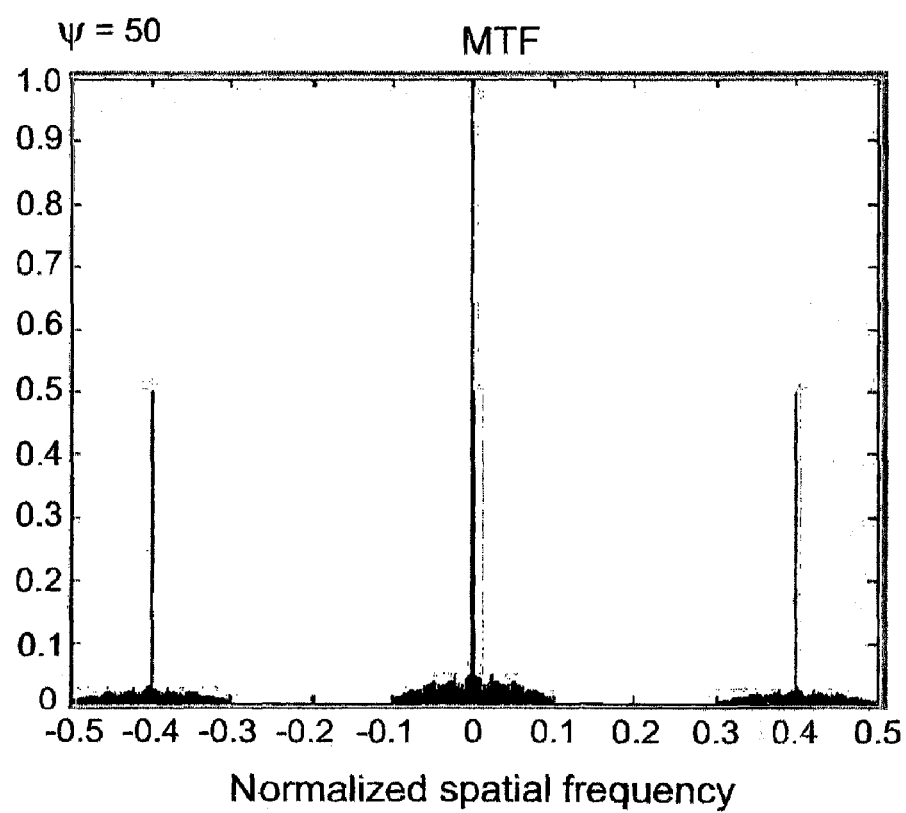

In FIG. 1D there is illustrated a mechanism according to which the characteristic (spiky) MTF mentioned above is formed. The MTF and OTF are dependent on auto-correlation of the field distribution in the aperture plane. In fact, the total field at the aperture plane is Fourier transformed when the light reaches the detector plane and its intensity is captured by the detector. From the Fourier transform properties, the operation of absolute value square over the field point spread function (PSF) obtained in the detector plane is equivalent to auto-correlation operation performed over the Fourier of the fields in the aperture plane. Thus, one needs to auto-correlate the electric field in the aperture plane.

It can be seen, that a field F, consisting of the symmetrized chirp SC and three replicas $SR_1$-$SR_3$, substantially overlaps with a replica F' of this field, consisting of the symmetrized chirp SC' and three replicas $SR'_1$-$SR'_3$, when the field and the replica are shifted for a specific distance with respect to each other. For example, in FIG. 1D, replica SC' almost coincides with replica $SR_2$. It is seen, that phase distributions between these replicas are highly correlated, because the black and gray lines within replicas are similarly oriented.

An electric field E, generated by the chirp diffracted at the random plate illuminated with the chirp, is dependent not only on the chirp's phase distribution, which due to defocusing is proportional to $\exp[iW_m(x^2+y^2)]$, $W_m$ being the amount of defocusing, (x,y) being a coordinate system centered at the optical axis OA, but it is also dependent on field transmission function m of the aperture. Thus we can write (derivations are exact up to a constant):

$$E(x', y') = a \Box m(x', y') \cdot \exp(iW_m((x' + x_0)^2 + (y' + y_0)^2)) + + \quad (1)$$
$$b \Box m(-x', y') \cdot \exp(iW_m((-x' + x_0)^2 + (y' + y_0)^2)) + +$$
$$c \Box m(x', -y') \cdot \exp(iW_m((x' + x_0)^2 + (-y' + y_0)^2)) + +$$
$$d \Box m(-x', -y') \cdot \exp(iW_m((-x' + x_0)^2 + (-y' + y_0)^2))$$

The random plate is a random field transmission plate, and m(x',y') is its field transmission function. As explained above, the mirroring is obtained due to the partially transparent mirrors 16 being perpendicular to the random plate.

Considering the replicating effect of mirrors (having field mirroring coefficients $\{A, B, C, D\}$) 26A and 26B, the total output may be expressed as:

$$E_{tot}(x,y) = A \cdot E(x,y) + B \cdot E(-x,y) + C \cdot E(-x,-y) + D \cdot E(x,-y) \quad (2)$$

This transmission function m(x',y') is selected so that the main term in its auto-correlation approaches a delta-function:

$$\int_{-\infty}^{\infty}\int_{-\infty}^{\infty} m(x', y')m^*(x' - x'', y' - y'')dx'dy' = T_m \cdot \delta(x'', y'') \quad (3)$$

where $T_m$ is defined as:

$$T_m = \int_{-\infty}^{\infty}\int_{-\infty}^{\infty} m(x', y')m^*(x', y')dx'dy' \quad (4)$$

Practically, the desired field transmission functions (i.e. which autocorrelation functions approach delta-function) can be provided by, for example, various random plates. The inventors have considered that a field transmission function which autocorrelation has a peak with energy between 50% and 60%, or between 60% and 70%, or between 70% and 80%, or between 80% and 90%, or between 90% and 100% of the total transmitted energy, is preferred for use in the invention.

When the OTF is calculated, the total field is auto-correlated:

$$OTF = (x'', y'') = \int_{-\infty}^{\infty}\int_{-\infty}^{\infty} E_{tot}(x, y)E_{tot}^*(x - x'', y - y'')dxdy \quad (5)$$

Thus, the overall result, obtained after using (2) in the autocorrelation expression (5), is:

$$OTF = (x'', y'') = \int_{-\infty}^{\infty}\int_{-\infty}^{\infty} E_{tot}(x, y)E_{tot}^*(x - x'', y - y'')dxdy \quad (6)$$
$$= coeff(0, 0)\delta(x'', y'') +$$
$$+ coeff(1, 0)\delta((x'' - x_0, y'') + coeff(-1, 0)\delta(x'' + x_0, y'' - y_0) +$$

-continued
$$coeff(0, 1)\delta(x'', y'' - y_0) + coeff(0, -1)\delta(x'', y'' + y_0) +$$
$$coeff(1, 1)\delta(x'' - x_0, y'' - y_0) + coeff(-1, -1)\delta(x'' + x_0, y'' + y_0) +$$
$$coeff(1, -1)\delta(x'' - x_0, y'' + y_0) + coeff(-1, 1)\delta(x'' + x_0, y'' - y_0)$$

where the calculated coefficients of delta functions are:

$$coeff(0, 0) = \int_{-\infty}^{\infty}\int_{-\infty}^{\infty} E_2 E_0^* \qquad (7)$$
$$= \int_{-\infty}^{\infty}\int_{-\infty}^{\infty} A \Box C \Box [cb|m(x', -y')|^2 + da|m(-x', -y')|^2 + ad|m(x', y')|^2 + bc|m(-x', y')|^2] =$$
$$= T_m AC(ad + bc)$$

$$coeff(1, 0) = \int_{-\infty}^{\infty}\int_{-\infty}^{\infty} E_0 E_1^* + E_3 E_2^*$$
$$= \int_{-\infty}^{\infty}\int_{-\infty}^{\infty} A \Box B \Box [cd|m(x', -y')|^2 + d\,c|m(-x', -y')|^2 + ab|m(x', y')|^2 + ba|m(-x', y')|^2] +$$
$$+ \int_{-\infty}^{\infty}\int_{-\infty}^{\infty} D \Box C \Box [ab|m(x', -y')|^2 + ba|m(-x', -y')|^2 + cd|m(x', y')|^2 + d\,c|m(-x', y')|^2] +$$
$$= T_m[(AB + CD)(ab + cd)]$$

$$coeff(0, 1) = \int_{-\infty}^{\infty}\int_{-\infty}^{\infty} E_1 E_2^* + E_0 E_3^*$$
$$= \int_{-\infty}^{\infty}\int_{-\infty}^{\infty} B \Box C \Box [d\,b|m(x', -y')|^2 + ca|m(-x', -y')|^2 + bd|m(x', y')|^2 + ac|m(-x', y')|^2] +$$
$$+ \int_{-\infty}^{\infty}\int_{-\infty}^{\infty} A \Box D \Box [ca|m(x', -y')|^2 + d\,b|m(-x', -y')|^2 + ac|m(x', y')|^2 + bc|m(-x', y')|^2] +$$
$$= T_m[(BC + AD)(ac + bd)]$$

$$coeff(1, 1) = \int_{-\infty}^{\infty}\int_{-\infty}^{\infty} E_0 E_2^*$$
$$= \int_{-\infty}^{\infty}\int_{-\infty}^{\infty} A \Box C \Box [cb|m(x', -y')|^2 + da|m(-x', -y')|^2 + ad|m(x', y')|^2 + bc|m(-x', y')|^2]$$
$$= T_m[AC(bc + ad)]$$

$$coeff(-1, 1) = \int_{-\infty}^{\infty}\int_{-\infty}^{\infty} E_1 E_3^*$$
$$= \int_{-\infty}^{\infty}\int_{-\infty}^{\infty} B \Box D \Box [d\,a|m(x', -y')|^2 + cb|m(-x', -y')|^2 + bc|m(x', y')|^2 + ad|m(-x', y')|^2]$$
$$= T_m[BD(ad + bc)]$$

$$coeff(1, -1) = \int_{-\infty}^{\infty}\int_{-\infty}^{\infty} E_1^* E_3 = coeff(-1, 1)$$

$$coeff(-1, 0) = \int_{-\infty}^{\infty}\int_{-\infty}^{\infty} E_0^* E_1 + E_3^* E_2 = coeff(1, 0)$$

$$coeff(0, -1) = \int_{-\infty}^{\infty}\int_{-\infty}^{\infty} E_1^* E_2 + E_0^* E_3 = coeff(0, 1)$$

$$coeff(-1, -1) = \int_{-\infty}^{\infty}\int_{-\infty}^{\infty} E_0^* E_2 = coeff(1, 1)$$

The mirroring coefficients must comply with energy conservation rule:

$$|A|^2 \cdot [|a|^2 + |b|^2 + |c|^2 + |d|^2] +$$
$$|B|^2 \cdot [|a|^2 + |b|^2 + |c|^2 + |d|^2] + |C|^2 [|a|^2 + |b|^2 + |c|^2 + |d|^2] +$$
$$|D|^2 \cdot [|a|^2 + |b|^2 + |c|^2 + |d|^2] = [|A|^2 + |B|^2 + |C|^2 + |D|^2] \cdot [|a|^2 + |b|^2 + |c|^2 + |d|^2] = 1 \qquad (8)$$

This integral can be presented as a product of auto-correlation of the chirp's field and autocorrelation of the field transmission function m of the aperture in several cases. In particular, the transparency m can be taken out of the integral when it is random. Also other cases when formula (5) can presented as a product of two autocorrelations are known. In FIGS. 2A-2D there are shown examples of an OTF obtained by the inventors as a result of (5) applied for their device. The examples are different in the degree of defocusing: while for FIG. 2A this degree is zero, for FIGS. 2C-2D it is larger. The defocusing factor is as high as 50 in FIG. 2D. Nevertheless, all FIGS. 2A-2D have high peaks at a spatial frequencies of approximately −0.4 and 0.4. This magnitude of spatial frequency corresponds to the relative shift between optical axes of the first and second symmetrizing units. Such a high MTF peak for the selected spatial frequency magnitude, and such a large range of the defocusing factor for which this peaks exists corresponds to the high energetic efficiency and large depth of focus of the device of the invention.

Further, the device of the invention can be used for achieving also the super resolution, if the detector is used to integrate light intensity while the chirp is scanned. As explained above, moving the random plate to various positions ($x_0, y_0$), creates an MTF containing peaks at spatial frequencies corresponding to those positions The correspondence through Fourier transform is meant: the positions in the aperture plane are proportional to the spatial frequencies in the detector plane. Hence, all various spatial frequencies can be obtained. The larger the maximum shift from pairs ($x_0, y_0$), the larger the obtained super resolution factor. This factor is unlimited, in the sense that any high spatial frequency can be transmitted through an appropriately designed random plane and recovered by scanning.

The operation of a device of the invention has been simulated by the inventors. Referring to FIGS. 3-5, there the simulation results are presented. The defocusing factor is measured as the maximal phase obtained at the edges of the aperture. It is determined as:

$$\Psi = \frac{W_m D^2}{4} = \frac{\pi D^2}{4\lambda}\left(\frac{1}{d_i} + \frac{1}{d_o} - \frac{1}{F}\right) \quad (9)$$

where $d_o$ and $d_i$ are the distances from the object and the image to the aperture plane, respectively; and F is an effective focal length of the imaging device to which it is desired to match the inventor's device performance.

Figure 3A:
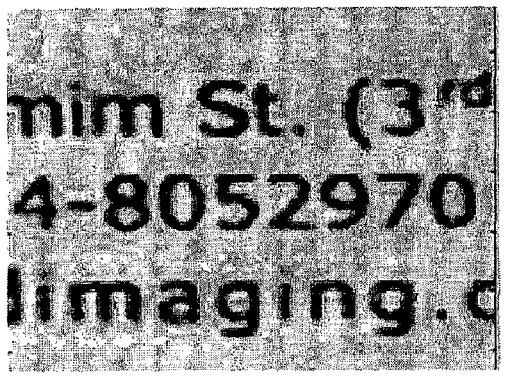
FIGS. 3A-3D, 4A-4D and 5A-5D show simulated images for various objects, obtained with the invented device (Figs. "A", "C") and without it (Figs. "B", "D"), for object positioned out of focus (Figs. "A", "B") and in focus (Figs. "C", "D")
Figure 3B:
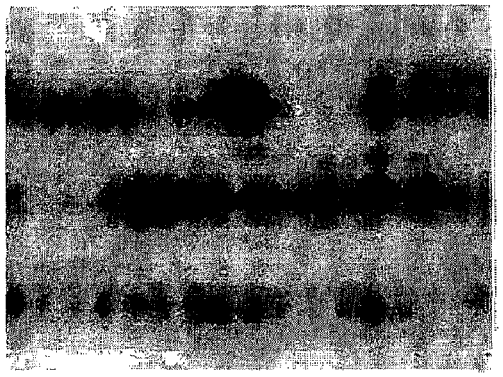
Figure 3C:
Figure 3D:
Figure 4A:
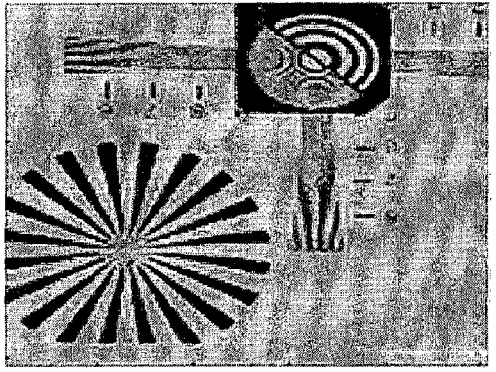
Figure 4B:
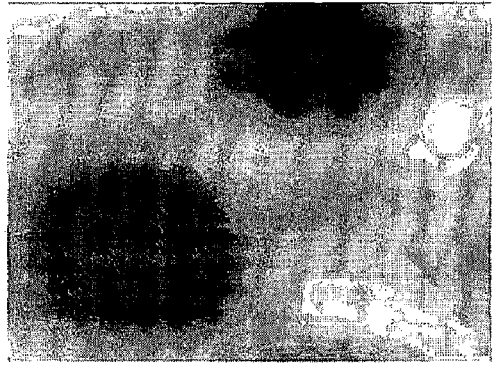
Figure 4C:
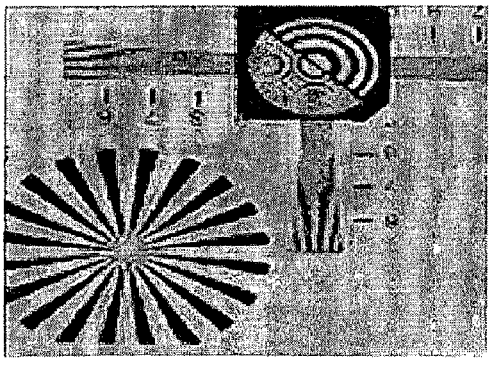
Figure 4D:
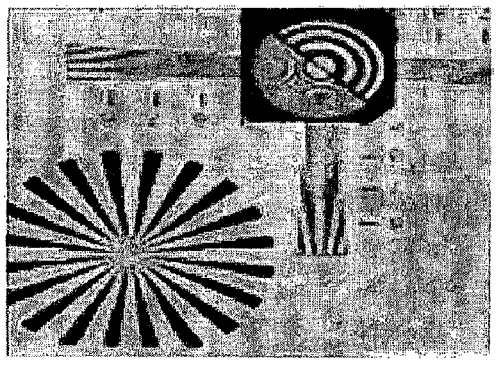
Figure 5A:
Figure 5B:
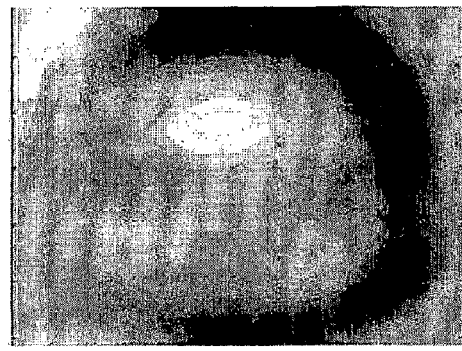
Figure 5C:
Figure 5D:

In FIGS. 3A-3D there is shown a set of reconstructions of a script image (i.e. of an image containing writing). In FIG. 3A there is presented the result obtained for the inventor's device for defocusing $\psi=10$. In FIG. 3B there is shown the image obtained for the same defocusing $\psi$ obtained without applying the inventor's technique. Images, shown in FIGS. 3C and 3D, are obtained for the script image positioned in focus ($\psi=0$), using and not using the inventor's technique, respectively. FIGS. 4A-4D and 5A-5D correspond to the FIGS. 3A-3D, but for an imaged object being a resolution target or a baby face, respectively. It should be noted that the results presented in FIGS. 3-5 are all-optical, because the scanning was simulated to gather all spatial frequencies detected by the detector with appropriate coefficients. No image processing was applied to further enhance images in FIGS. 3-5.

Figure 6:
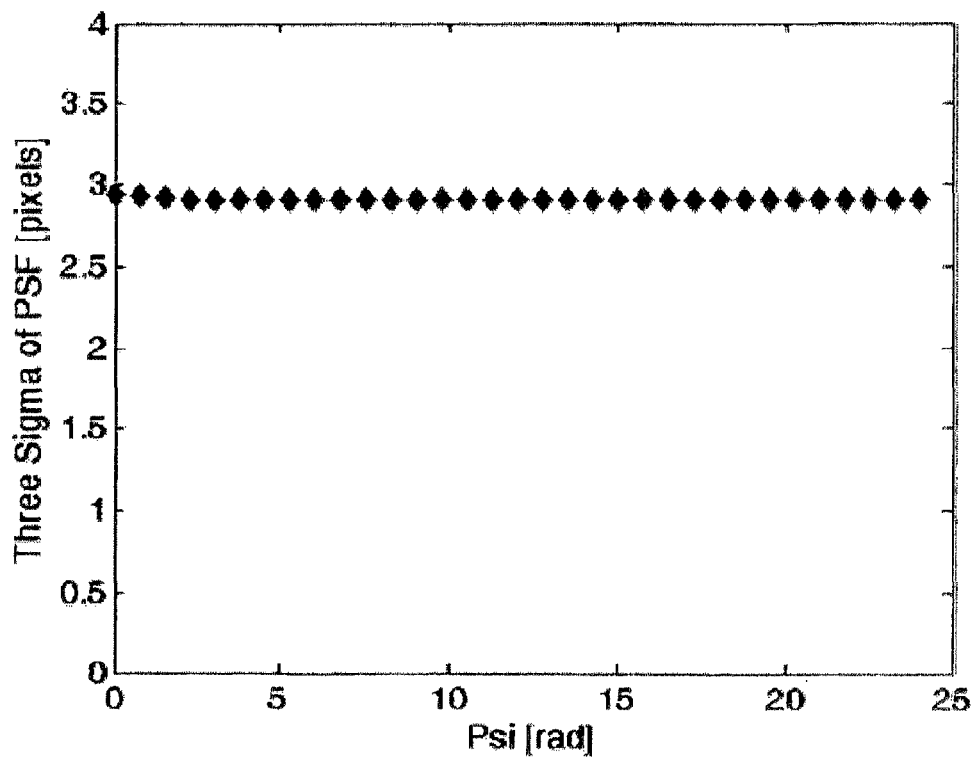
FIG. 6 shows a graph of dependence of a width of the point spread function for the invented device on the amount of defocusing of the point source; the width is defined as three standard deviations of the point spread function.

FIG. 6 presents the width of three standard deviations of an intensity point spread function obtained in the image plane versus the defocusing $\psi$. It is seen, that even for very strong defocusing of $\psi=25$, the standard deviation remains only 1 pixel, and the spatial point spread function is therefore relatively narrow, i.e. not spread.

While this invention has been particularly shown and described with references to preferred embodiments thereof, it will be understood by those skilled in the art that various changes in form and details may be made therein without departing from the scope of the invention encompassed by the appended claims.

What is claimed is:

1. An optical arrangement for use in imaging with a large depth of focus, said optical arrangement comprising an aperture unit, and
a replication unit configured for providing a plurality of replicas of an input optical field such that said replicas include at least two replicas that are of substantially the same phase distribution and are created at different regions of the aperture unit plane.

2. The optical arrangement of claim 1, wherein said replication unit comprises at least first and second symmetrizing units configured for providing the at least two replicas of the input optical field while sequentially symmetrizing the input optical field projected on said aperture unit with respect to first and second centers of symmetry, respectively.

3. The optical arrangement of claim 2, wherein said first symmetrizing unit is configured for symmetrizing a portion of a chirp of the input optical field passed through said aperture unit, and said second symmetrizing unit is configured for symmetrizing an output of said first symmetrizing unit.

4. The optical arrangement of claim 2, wherein the aperture unit and the first and second symmetrizing units are configured such that at least one of the replicas is displaceable with respect to the other.

5. The optical arrangement of claim 4, comprising a scanner, configured and operable to provide said displacement of at least one of the replicas by providing a relative displacement of at least one of the aperture unit and said first symmetrizing unit with respect to the second symmetrizing unit.

6. The optical arrangement of claim 1, wherein the replication unit comprises reflective surfaces.

7. The optical arrangement of claim 1, wherein said reflective surfaces are formed by at least first and second reflector units accommodated in a spaced-apart relationship along an optical axis of light propagation through the optical arrangement towards an imaging plane.

8. The optical arrangement of claim 7, wherein each of the first and second reflector units comprises two reflectors defining mutually perpendicular reflective surfaces such that the reflective surface of the first reflector unit are substantially parallel to the respective reflective surfaces of the second reflector unit.

9. The optical arrangement of claim 1, wherein the replication unit comprises at least one of the following: an array of optical fibers, a spatial light modulator, and one or more corner prisms.

10. The arrangement of claim 1, wherein said aperture unit comprises a random plate.

11. The optical arrangement of claim 1, comprising a pixel detector array in an imaging plane.

12. A method for use in imaging to provide imaging with a large depth of focus, the method comprising
passing an input optical field to be imaged through an aperture plate, and
optically processing the optical field passed through the aperture plate to produce a plurality of replicas of said optical field such that said replicas include at least two replicas that are of substantially the same phase distribution and are created at different regions of the aperture plane.

* * * * *